US008666379B2

(12) United States Patent
Tanabe

(10) Patent No.: US 8,666,379 B2
(45) Date of Patent: *Mar. 4, 2014

(54) COMMUNICATION TERMINAL

(75) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,160

(22) Filed: Jul. 3, 2012

(65) Prior Publication Data

US 2012/0270608 A1 Oct. 25, 2012

Related U.S. Application Data

(63) Continuation of application No. 12/307,913, filed as application No. PCT/JP2008/058984 on May 9, 2008, now Pat. No. 8,229,399.

(30) Foreign Application Priority Data

May 17, 2007 (JP) .................................. 2007-131572

(51) Int. Cl.
*H04M 3/42* (2006.01)
(52) U.S. Cl.
USPC .......................................... 455/415; 455/566
(58) Field of Classification Search
USPC ................ 455/411, 422.1, 425, 550.1, 552.1, 455/556.1, 556.2, 558, 566; 715/739, 747, 715/763, 781, 783, 795, 800, 815, 821; 345/76, 87, 160, 168, 173
See application file for complete search history.

(56) References Cited

U.S. PATENT DOCUMENTS

| 5,796,394 | A | 8/1998 | Wicks et al. |
| 6,119,020 | A | 9/2000 | Miller et al. |
| 6,125,283 | A | 9/2000 | Kolev et al. |
| 6,185,436 | B1 | 2/2001 | Vu |
| 7,533,342 | B1 | 5/2009 | Vialle et al. |
| 7,694,232 | B2 * | 4/2010 | Adams et al. ................. 715/788 |

(Continued)

FOREIGN PATENT DOCUMENTS

| DE | 10138835 | 2/2003 |
| EP | 1624649 A1 | 2/2006 |

(Continued)

OTHER PUBLICATIONS

Korean Office Action dated Nov. 8, 2010 in corresponding Korean Application No. 10-2009-7004857.

(Continued)

*Primary Examiner* — Michael Faragalla
*Assistant Examiner* — Gerald Oliver
(74) *Attorney, Agent, or Firm* — Fitzpatrick, Cella, Harper & Scinto

(57) ABSTRACT

There is provided a communication terminal comprising: a readout unit which reads out, from a plurality of storage media each storing an identifier concerning a communication line, the identifiers; a communication unit which determines the communication lines based on the identifiers read out by the readout unit, and performs communication using the determined communication lines; a display unit; and a display control unit which displays, on the display unit, information corresponding to the identifiers, wherein the display control unit generates a plurality of display screens for displaying information corresponding to the plurality of communication lines determined based on the plurality of identifiers, and displays the plurality of display screens after dividing a display area of the display unit.

5 Claims, 15 Drawing Sheets

(56) References Cited

U.S. PATENT DOCUMENTS

| | | | |
|---|---|---|---|
| 7,706,839 B2 | 4/2010 | Ueno | |
| 7,788,577 B2 * | 8/2010 | Lueck | 715/239 |
| 7,840,212 B2 | 11/2010 | Caspi et al. | |
| 7,912,497 B2 | 3/2011 | Isidore et al. | |
| 2002/0006808 A1 | 1/2002 | Onaka et al. | |
| 2006/0063565 A1 | 3/2006 | Ueno | |
| 2006/0270441 A1 | 11/2006 | Miyata | |
| 2007/0015546 A1 | 1/2007 | Ito | |
| 2007/0049335 A1 | 3/2007 | Haitani et al. | |
| 2007/0064682 A1 * | 3/2007 | Adams et al. | 370/352 |
| 2007/0087789 A1 * | 4/2007 | Lee et al. | 455/566 |
| 2008/0003985 A1 | 1/2008 | Jung et al. | |
| 2008/0020773 A1 | 1/2008 | Black et al. | |
| 2008/0064443 A1 | 3/2008 | Shin et al. | |
| 2008/0182599 A1 | 7/2008 | Rainisto et al. | |
| 2008/0242282 A1 | 10/2008 | Kuhl et al. | |
| 2008/0300023 A1 | 12/2008 | Kim et al. | |
| 2009/0061932 A1 | 3/2009 | Nagarajan | |
| 2009/0098882 A1 | 4/2009 | Yoon | |

FOREIGN PATENT DOCUMENTS

| | | |
|---|---|---|
| FR | 2871021 | 12/2005 |
| JP | 2002044729 | 2/2002 |
| JP | 2002095038 | 3/2002 |
| JP | 2003143646 | 5/2003 |
| JP | 2003189361 | 7/2003 |
| JP | 2004228694 | 8/2004 |
| JP | 2007006192 | 1/2007 |
| KR | 1020030068761 A | 8/2003 |
| KR | 2004-0055141 A | 6/2004 |
| KR | 1020050080418 A | 8/2005 |
| WO | 0223868 | 3/2002 |
| WO | 2004102930 | 11/2004 |

OTHER PUBLICATIONS

PCT International Search Report and Written Opinion of the International Searching Authority mailed Jul. 15, 2008 in PCT/JP2008/058984.

Russian Office Action dated Feb. 1, 2011 in corresponding Russian Application No. 2009146820.

European Search Report dated Dec. 16, 2011 in 08752838.6.

* cited by examiner ical Application No. PCT/JP2008/058984, filed May 9, 2008. The contents of each of the foregoing applications are incorporated herein by reference.

COMMUNICATION TERMINAL

This application is a continuation of U.S. patent application Ser. No. 12/307,913, which was the National Stage of International Application No. PCT/JP2008/058984, filed May 9, 2008. The contents of each of the foregoing applications are incorporated herein by reference.

TECHNICAL FIELD

The present invention relates to a communication terminal, and more particularly to an apparatus that performs communication using a plurality of communication lines.

BACKGROUND ART

Conventionally, mobile telephones are a known form of mobile communication terminal.

With IMT-2000 mobile phones, in particular, an IC card called a SIM (Subscriber Identity Module) card is distributed to users.

Each SIM card stores a subscriber identifier representing information such as a telephone (subscriber) number or a carrier (contracted company and the communication scheme thereof) for every line contract. Mounting this SIM card in a phone and reading out an identifier from the SIM card enables calls to be made and taken. Also, interchanging the SIM card for mounting in a phone enables a plurality of phones to be used for different purposes using a single contracted line.

In the case where a single user contracts a plurality of communication lines, SIM cards storing an identifier for every contract are provided. Therefore, interchanging the SIM cards for mounting in a phone enables a plurality of lines to be used for different purposes with the one phone.

A phone capable of mounting two SIM cards has also been proposed (e.g., see Japanese Patent Application Laid-Open No. 2003-189361). Therefore, mounting the two SIM cards provided as a result of a user contracting two lines enables calls to be made using these two lines with the one phone.

If only one line is used, only functions and operation screens tailored to the contracted line need be displayed.

However, in the case of a phone capable of using a plurality of lines, the user needs to ascertain the antenna status (signal strength) for each line, and be aware of incoming emails and the like. Also, functions and provided applications may differ for each contracted line or carrier.

Therefore, user-friendly screen display tailored to the operation conditions and functions of each communication line being used is desirable.

Heretofore, user-friendly display screens for a mobile phone that thus uses a plurality of lines has not been proposed.

DISCLOSURE OF INVENTION

It is the feature of the present invention to solve problems like the above, and to provide an apparatus that enables information related to each line to be readily perceived, even in the case where a plurality of communication lines are utilized.

According to an aspect of the present invention, there is provided a communication terminal comprising: a readout unit which reads out, from a plurality of storage media each storing an identifier concerning a communication line, the identifiers; a communication unit which determines the communication lines based on the identifiers read out by the readout unit, and performs communication using the determined communication lines; a display unit; and a display control unit which displays, on the display unit, information corresponding to the identifiers, wherein the display control unit generates a plurality of display screens for displaying information corresponding to the plurality of communication lines determined based on the plurality of identifiers, and displays the plurality of display screens after dividing a display area of the display unit.

According to another aspect of the present invention, there is provided a communication terminal comprising: a readout unit which reads out, from a plurality of storage media each storing an identifier concerning a communication line, the identifiers; a communication unit which determines the communication lines based on the identifiers read out by the readout unit, and performs communication using the determined communication lines; a plurality of display units; and a display control unit which displays, on the plurality of display units, information corresponding to the identifiers, wherein the display control unit generates a plurality of display screens for displaying information corresponding to the plurality of communication lines determined based on the plurality of identifiers, and displays the respectively different display screens on the plurality of display units.

Further features of the present invention will become apparent from the following description of exemplary embodiments with reference to the attached drawings.

BRIEF DESCRIPTION OF DRAWINGS

FIGS. 4A and 4B are flowcharts showing processing when the mobile telephone is powered on.

FIGS. 12A and 12B are flowcharts showing processing when the mobile telephone is powered on.

BEST MODE FOR CARRYING OUT THE INVENTION

Hereinafter, embodiments according to the present invention will be described in detail in accordance with the accompanying drawings.

Embodiment 1

Figure 1:
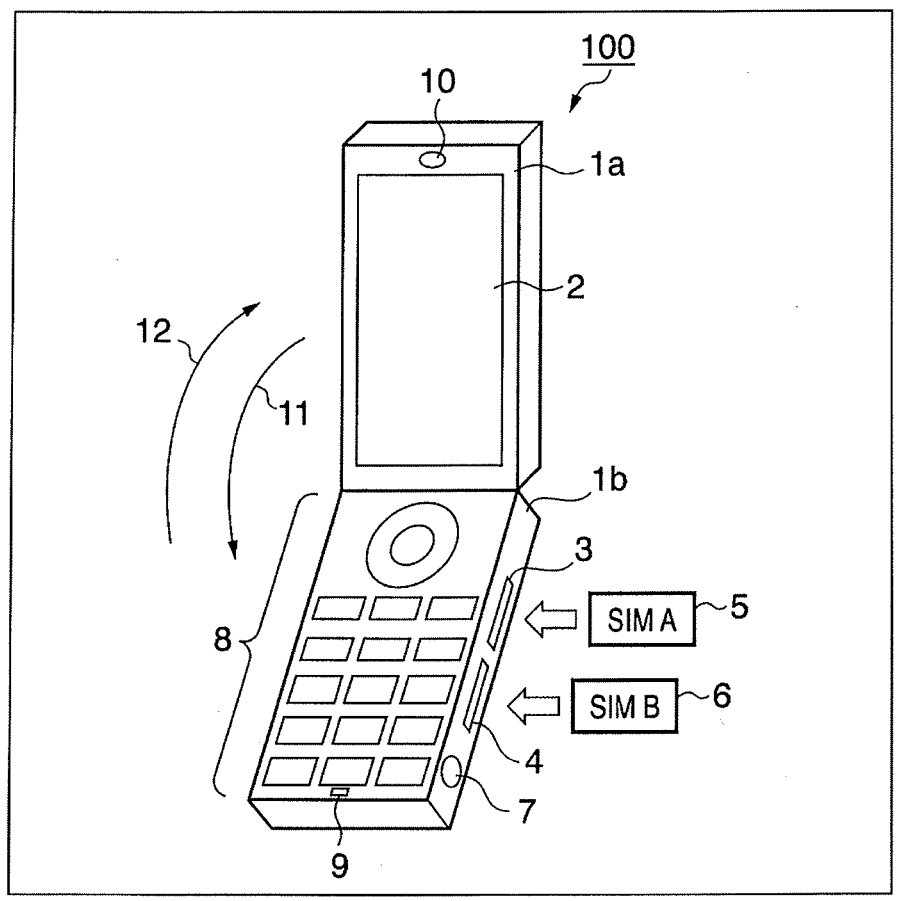
FIG. 1 is an external view of a mobile telephone in an embodiment.

FIG. 1 shows an external configuration of a mobile telephone constituting an embodiment of the present invention.

The mobile telephone 100 (hereinafter "phone") in FIG. 1 is capable of communication using a plurality of communication schemes. In the present embodiment, the phone 100 is capable of communication using W-CDMA and CDMA2000. Of course, communication schemes other than these may be used, and communication using three or more communication schemes can also be made possible.

Apart from a voice communication function, the phone 100 has a multimedia function for video conferencing or the like, an email sending/receiving function, and a WEB browser function. Further, the mobile phone 100 has a telephone directory function, an electronic organizer function, a function for downloading and using games and other applications, a navigation function, and a music playback function.

Casings 1a and 1b of the phone 100 are assumed to incorporate an antenna and a vibrator that vibrates the phone when there is an incoming call or the like. A liquid crystal display unit (LCD) 2 is provided in the casing 1a. A speaker 10 is disposed above the display unit 2.

Two SIM slots 3 and 4 for mounting SIM cards are provided in the phone 100. Different SIM cards 5 and 6 can be mounted in these SIM slots 3 and 4. The SIM cards 5 and 6 can each be freely removed.

A microphone 9 for inputting voice during a telephone conversation is disposed at the very bottom of the casing 1b, and a key operation unit 8 for operation inputs related to various functions in addition to the talk function is provided on a lower portion of the casing 1b. A line change button 7 used as a switching button for activating the contracted line of a SIM card mounted in one of the SIM slots 3 and 4 is disposed on a side face of the casing 1b.

The casings 1a and 1b of the phone 100 can be rotated in the direction of arrow 11 or 12. The phone 100 can be closed by rotating the casing 1a in the direction of arrow 11 when the phone 100 is open. The display unit 2 is on the inside of the phone when the phone 100 is closed. The phone 100 can be opened by rotating the casing 1a in the direction of arrow 12 when the phone 100 is closed.

The user is able to use various functions by operating the key operation unit 8 with the phone 100 open. Incoming call and email operations can also be performed with the phone 100 closed.

Figure 2:
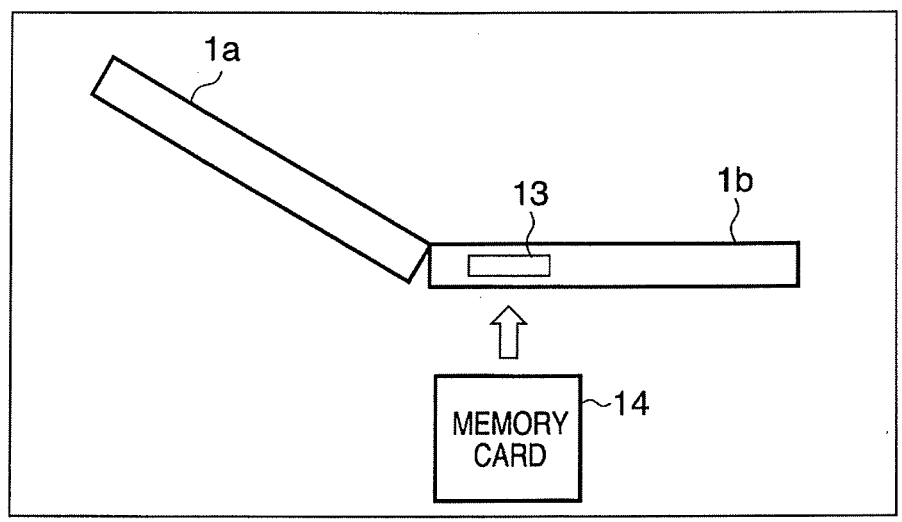
FIG. 2 is an external view of the mobile telephone in the embodiment.

FIG. 2 shows the phone 100 from the left side. As shown in FIG. 2, the phone 100 is provided with a memory card slot 13 for mounting a memory card 14. Data and the like for executing various functions used on the phone 100 can be stored in the memory card 14.

Figure 3:
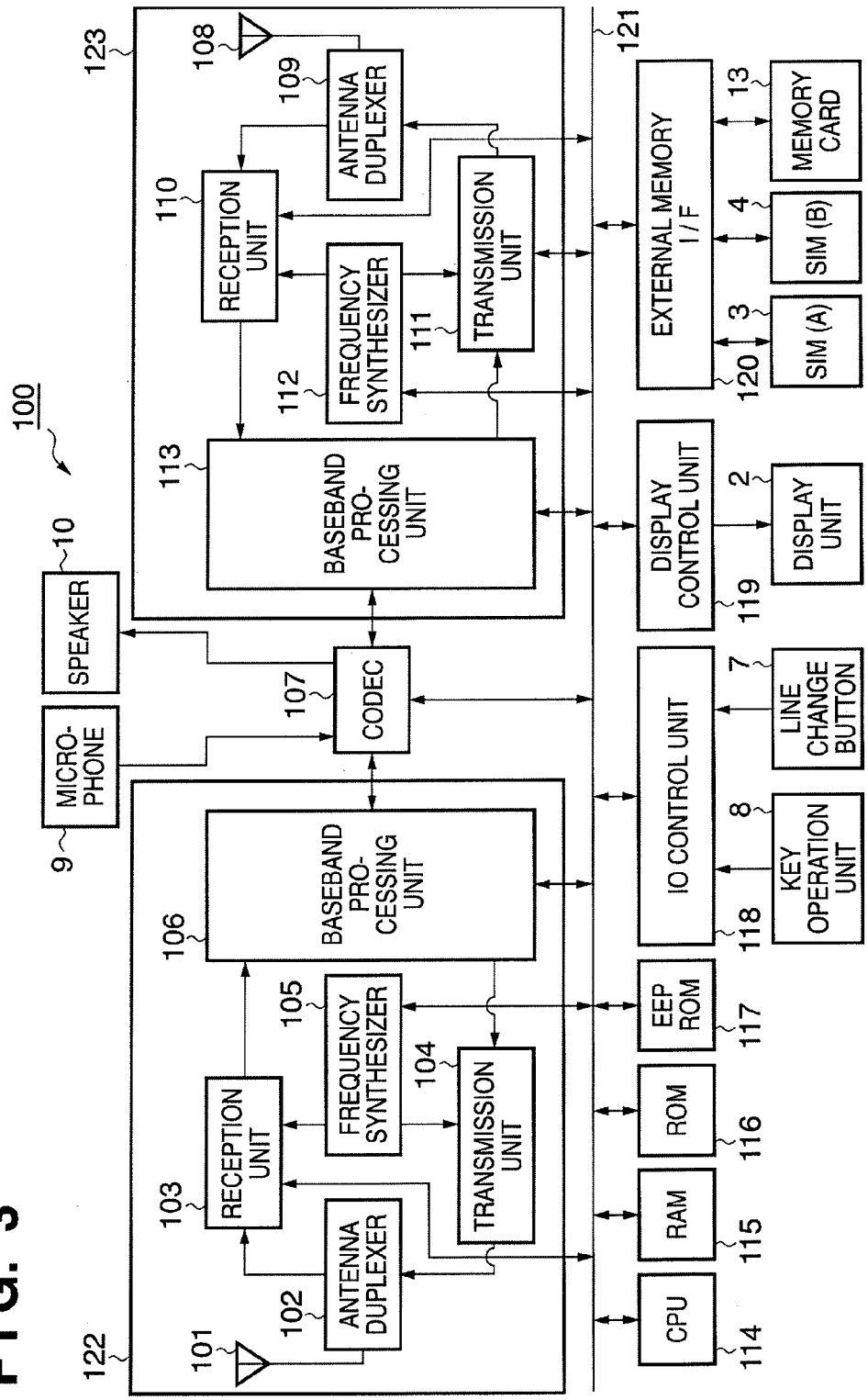
FIG. 3 is a block diagram showing a configuration of the mobile telephone in the embodiment.

FIG. 3 is a block diagram showing an internal configuration of the phone 100 in FIG. 1. Note that the block diagram of FIG. 3 primarily illustrates only the blocks required for the talk function and the email sending/receiving function. As aforementioned, the phone 100 has various other functions apart from the talk function and the email sending/receiving function, although because known configurations are used for these functions, related blocks and detailed descriptions thereof will be omitted.

In FIG. 3, the various operations of the phone 100 are controlled by a CPU 114. The CPU 114 controls the units via a CPU bus 121. A RAM 115 and a ROM 116 for storing data and computer programs, and an EEPROM 117 that constitutes a nonvolatile memory capable of holding data even if the phone is powered off are connected to the CPU bus 121.

The CPU 114 receives key inputs from the key operation unit 8 and key inputs from the line change button 7 via an input/output (IO) control unit 118, and performs controls to illuminate the buttons of the key operation unit 8. The CPU 114 also displays various images and information on the display unit 2 by controlling a display control unit 119.

The CPU 114 reads information from SIM cards mounted in the SIM slot 3 (SIM slot A) and the SIM slot 4 (SIM slot B) via an external memory interface (I/F) 120. Further, the CPU 114 executes data writing and reading on a mounted memory card via the memory card slot 13.

The phone 100 is provided with a W-CDMA (first communication scheme) communication unit 122 and a CDMA2000 (second communication scheme) communication unit 123. The phone 100 performs communication after selecting the communication unit 122 or the communication unit 123 in accordance with subscriber information read from the mounted SIM card 5 or 6, as will be discussed below.

Firstly, basic call/email reception and transmission processing in the phone 100 will be described.

Here, processing by the first communication unit 122 when an incoming call or email (collectively referred to as "incoming data") is received will be described as an example.

A wireless signal sent from a base station (not shown) is received by an antenna 101, and the received signal is input to a reception unit 103 via an antenna duplexer 102. The reception unit 103 is provided with a high frequency amplifier, a frequency converter, and a demodulator. After low-noise amplifying the received signal with a low noise amplifier, the reception unit 103 frequency-converts the low-noise amplified signal to a reception intermediate frequency signal or a reception baseband signal by synthesizing the low-noise amplified signal with a receiver local oscillator signal produced by a frequency synthesizer 105. The reception unit 103 then demodulates the frequency-converted signal with the demodulator.

The demodulated signal is sent to a baseband processing unit 106, and separated into voice signal and email data. The voice data is decoded by a codec 107 in accordance with the communication scheme, and output to the speaker 10.

On the other hand, email data is sent to the RAM 115 and saved. The user is able to arbitrarily read out email data saved to the RAM 115 and display the read email data on the display unit 2 by operating the key operation unit 8.

When there is an incoming call, the voice of the communication partner is thus output from the speaker 10.

On the other hand, in the case of transmitting voice during a telephone conversation, the voice signal of the user output from the microphone 9 is encoded according to the communication scheme by the codec 107. In the case of W-CDMA, the encoded voice data is output to the transmission unit 104 after having required processing performed thereon by the baseband processing unit 106. The transmission unit 104 is provided with a modulator, a frequency converter, and a transmission power amplifier. After modulating the voice data in accordance with the communication scheme, the transmission unit 104 frequency-converts the modulated data to a wireless frequency signal by synthesizing the modulated data with a transmitter local oscillator signal generated by the frequency synthesizer 105. The converted signal is transmitted to the base station (not shown) via the antenna duplexer 102 and the antenna 101 after being amplified.

The user is able to end the telephone conversation by operating the key operation unit 8.

Next, the processing when there is an outgoing call will be described.

The user inputs the telephone number of the communication partner and gives the instruction for an outgoing call by operating the key operation unit 8. When an instruction for an outgoing call is given, the CPU 114 sends data for the outgoing call to the baseband processing unit 106. The baseband processing unit 106 sends the data for the outgoing call to the transmission unit 104, which performs modulation, frequency conversion and amplification on the received data as described above, and transmits the resultant signal to the base station (not shown) using the antenna duplexer 102 and the antenna 101.

The base station confirms the incoming call from the communication partner and sends a wireless signal, which is received by the antenna 101, and similar processing to the case of an incoming call described above is then executed.

In the case of transmitting an email, the user gives the instruction for email creation using the key operation unit 8. When the instruction for email creation is given, the CPU 114 controls the display control unit 119 to display an email creation screen on the display unit 2. The user inputs the send-to address and the body, and gives the instruction for transmission using the key operation unit 8. When the instruction for email transmission is given, the CPU 114 sends the address information to the baseband processing unit 106, and the body data to the codec 107. The codec 107 encodes the body data and sends the encoded data to the baseband processing unit 106.

The baseband processing unit 106 sends the address and body data to the transmission unit 104, which performs modulation and other processing on the received data, and transmits the resultant signal to the base station via the antenna duplexer 102 and the antenna 101.

An antenna 108, an antenna duplexer 109, a reception unit 110, a transmission unit 111, a frequency synthesizer 112, and a baseband processing unit 113 in the communication unit 123 have respectively similar functions to corresponding blocks in the communication unit 122. There may, however, also be changes tailored to differences in the communication schemes.

In the present embodiment, subscriber identifiers are read from the SIM cards mounted in the SIM slots 3 and 4, and communication is performed based on these subscriber identifiers.

Figure 18:
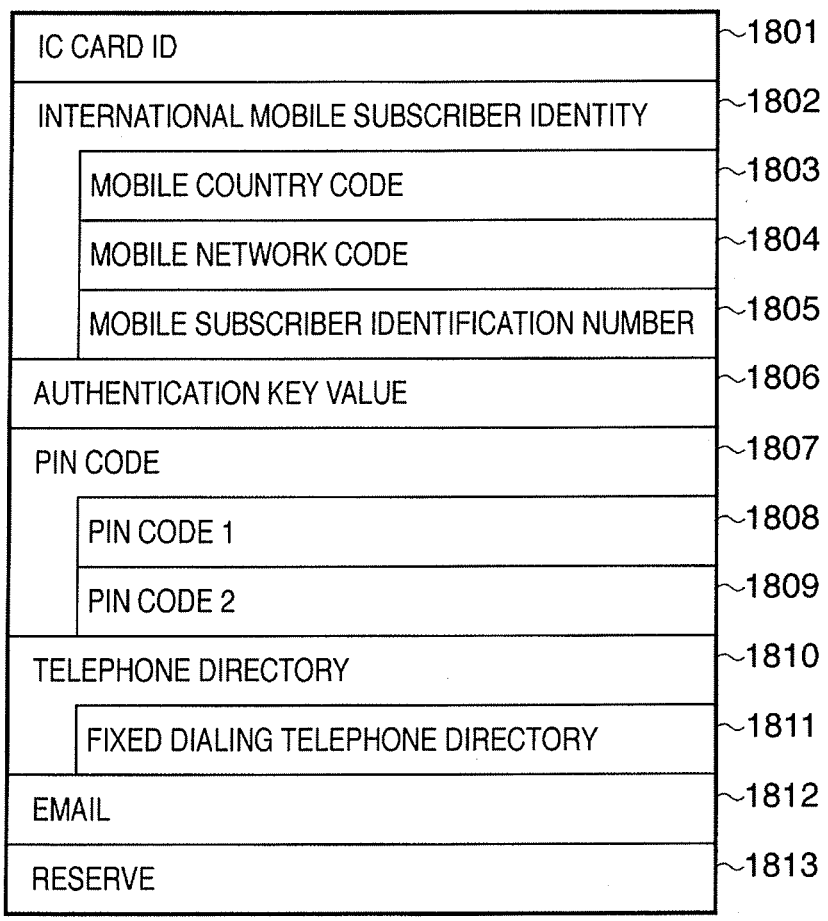
FIG. 18 shows an identifier stored on a SIM card.

Here, information stored on a SIM card will be described.
FIG. 18 shows information stored on a SIM card.

The SIM card stores an Integrated Circuit Card ID (IC Card ID) 1801, an International Mobile Subscriber Identity (IMSI) 1802, an Authentication Key Value 1806, a PIN code 1807, a telephone directory 1810, email data 1812, and a reserve 1813.

The IC Card ID 1801 is information for uniquely identifying the SIM card. The IMSI 1802 is information for specifying the subscriber provided by the contracted carrier. The IMSI 1802 is constituted by a Mobile Country Code (MCC) 1803, a Mobile Network Code (MNC) 1804, and a Mobile Subscriber Identification Number (MSIN) 1805. The country of the contracted carrier can be discriminated by the MCC 1803, and the contracted carrier can be identified by the MNC 1804. The MSIN 1805 is provided to the subscriber as a telephone number.

The Authentication Key Value 1806 is information for performing authentication with the phone in order to access the telephony network provided by the carrier. The PIN (Personal Identification Number) code 1807 is an authentication code for specifying the user when a SIM card is mounted in the phone, in order to protect against unauthorized use by a third party. Two types of PIN codes (PIN code 1 1808, PIN code 2 1809) can be saved.

The telephone directory 1810 includes a fixed dialing telephone directory 1811 whereby an outgoing call is enabled by entering the PIN code 2 1809.

Next, SIM card detection, and controls on the communication units 122 and 123 and the display unit 2 performed when the phone is powered on will be described using the flowcharts of FIGS. 4A and 4B.

Note that with the phone 100 of the present embodiment, SIM cards cannot be removed from the SIM slots while the phone 100 is turned on. Therefore, when mounting or ejecting a SIM card, the user turns off the phone 100.

Figure 4A:
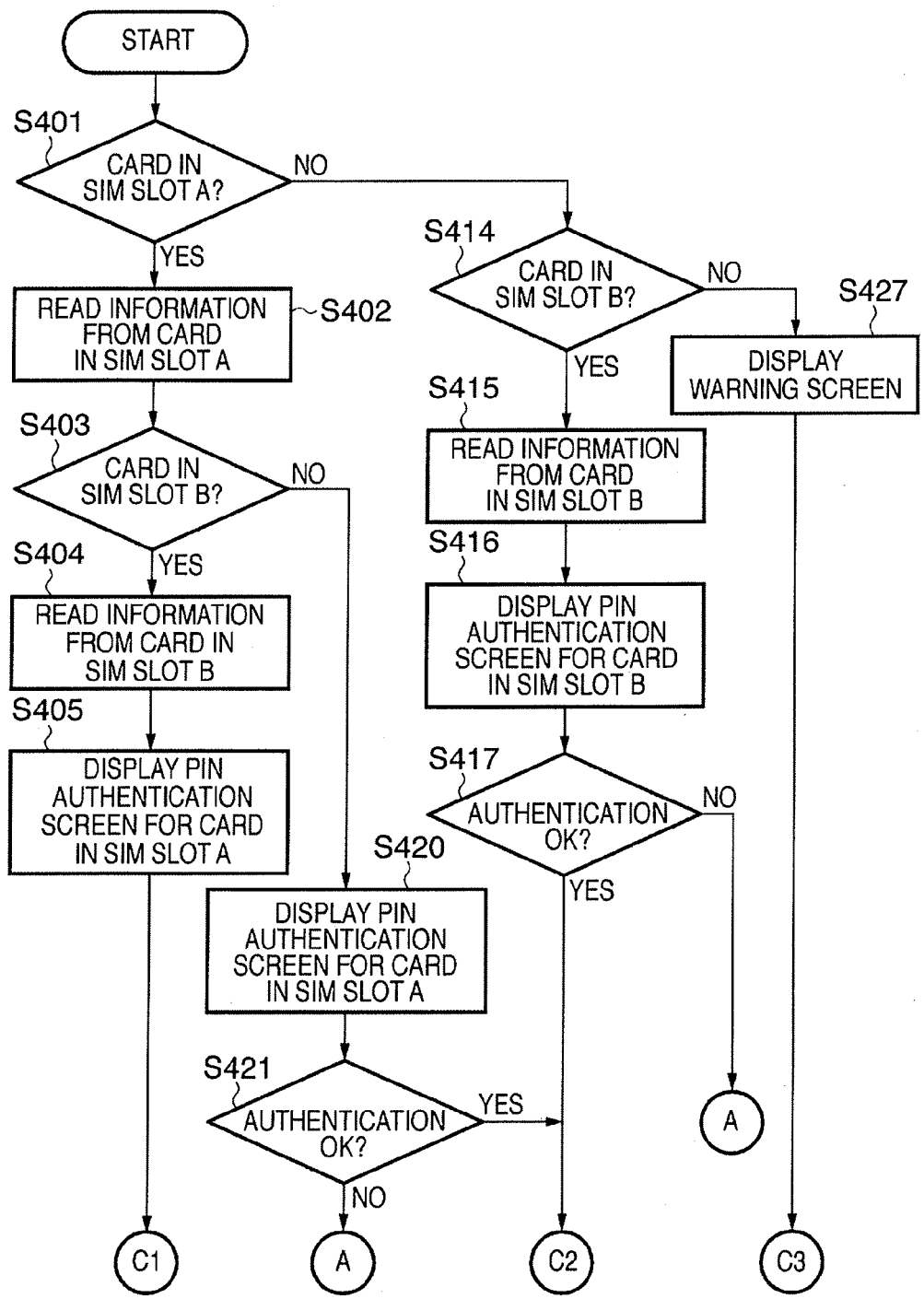
Figure 4B:
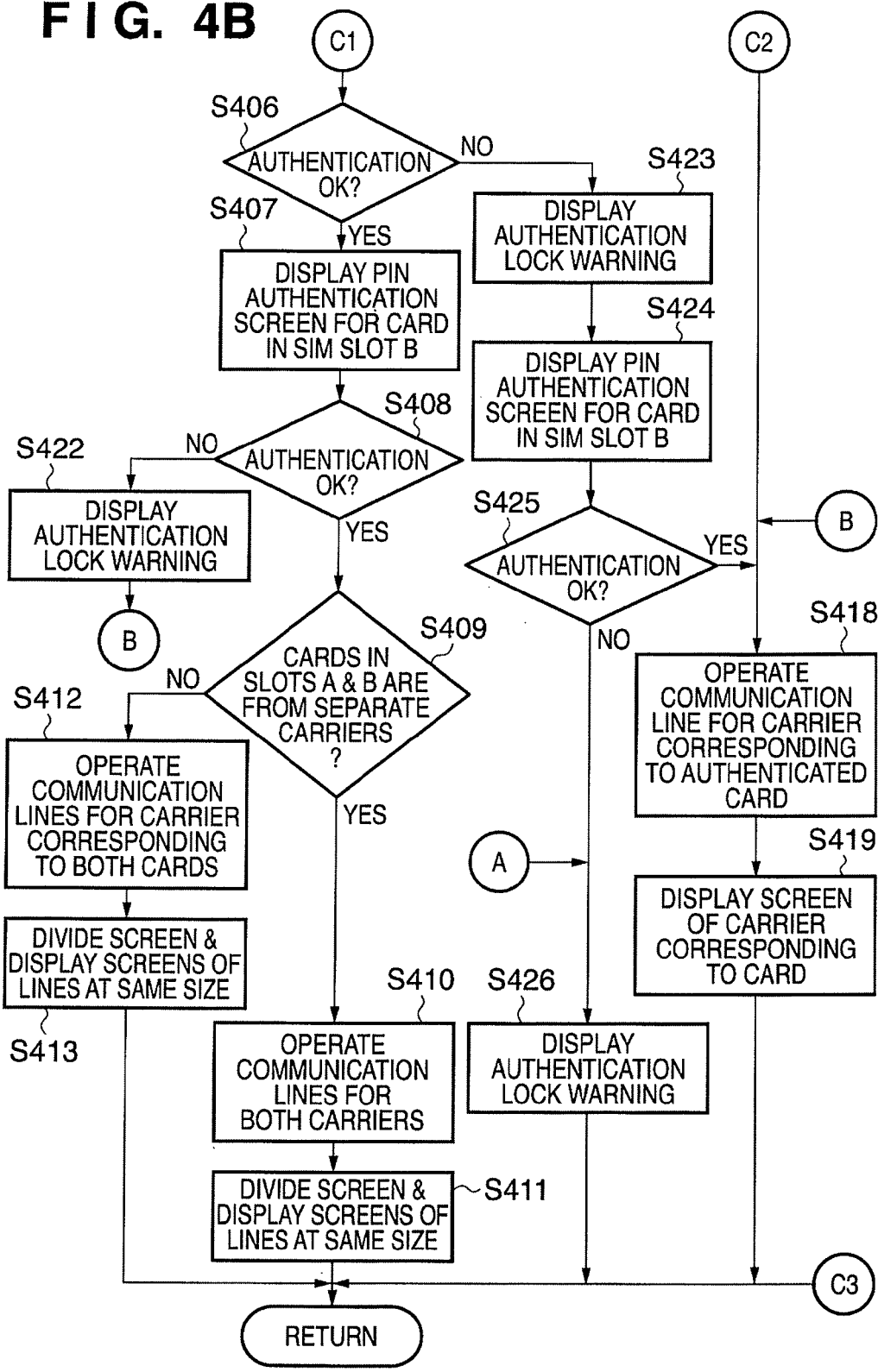

The flowcharts of FIGS. 4A and 4B start when the phone 100 is powered on by operating the key operation unit 8 after SIM cards have been ejected or mounted while the phone 100 was thus turned off. Note that the processing of FIGS. 4A and 4B is executed as a result of the CPU 114 controlling various units.

Firstly, it is determined whether a SIM card is mounted in the SIM slot 3 (S401). If a SIM card is mounted in the SIM slot 3, subscriber information like in FIG. 18 is read out from the SIM card via the SIM slot 3, and stored in the RAM 115 (S402).

Then, it is determined whether a SIM card is mounted in the SIM slot 4 (S403). If a SIM card is mounted in the SIM slot 4, subscriber information like in FIG. 18 is read out from the SIM card via the SIM slot 4, and stored in the RAM 115 (S404).

Figure 19:
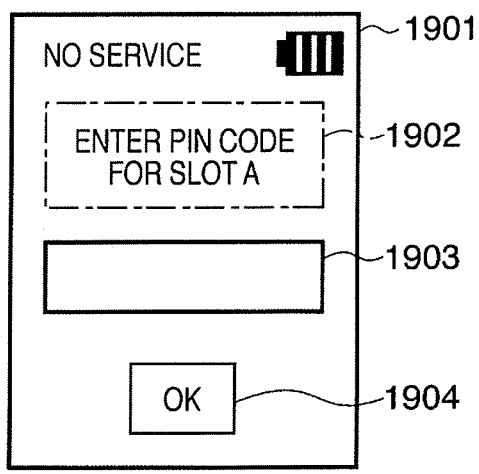
FIG. 19 shows a screen for entering a PIN code.

Next, a screen for authentication with the PIN code of the card in the SIM slot 3 is generated and displayed on the display unit 2 (S405). FIG. 19 shows a PIN code entry screen.

Reference numeral 1901 denotes a display screen of the display unit 2 that displays a message 1902 prompting the user to enter a PIN code. The user enters a PIN code in the entry field 1903 using the key operation unit 8. Reference numeral 1904 denotes a determination button.

Once a PIN code has been entered by the user after the PIN code entry screen is displayed, it is determined whether the entered code matches a PIN code read out from the card in the SIM slot 3 (S406). If the PIN code matches and is correctly authenticated, a screen for authenticating the PIN code of the card in the SIM slot 4 is generated and displayed on the display unit 2 (S407).

Once a PIN code has been entered by the user as described above, it is determined whether the entered code matches a PIN code read out from the card in the SIM slot 4 (S408). If the PIN code matches and is correctly authenticated, it is determined whether the card in the SIM slot 3 and the card in the SIM slot 4 are cards from separate carriers, based on identifiers read from the cards in the card slots (S409).

In the case where the two cards correspond to separate carriers, the communication units corresponding to the communication schemes of both carriers are operated (S410). For example, if the communication schemes of both carriers differ, the communication units 122 and 123 are operated together (S410). The communication lines to be used are determined based on the identifiers of the cards. Information showing application programs set for each contracted line is read from the ROM 116 based on the identifiers, and user information such as wallpaper and address information is further read from the EEPROM 117. The read information is stored in the RAM 115. The display control unit 119 is controlled to generate a display screen for each line, and simultaneously display the display screens of the lines on the display unit 2 after dividing the display area of the display unit 2 in two (S411).

Figure 6:
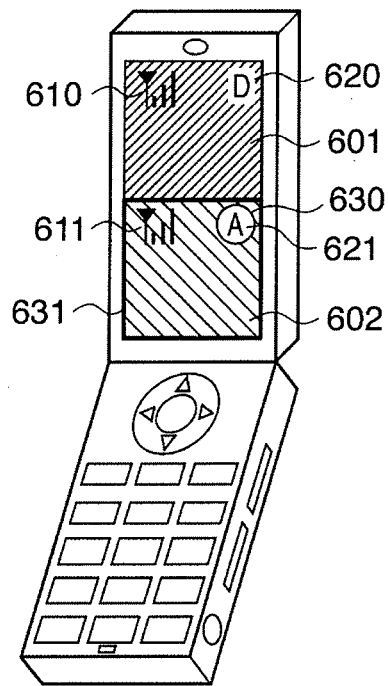
FIG. 6 shows the appearance of display screens on the mobile telephone.

An exemplary display screen at this time is shown in FIG. 6.

As shown in FIG. 6, the display screen of the display unit 2 is divided in two, and screens 601 and 602 are displayed for each contracted line.

For example, in FIG. 6, information 610 showing the signal strength on the contracted line tailored to the SIM card in the SIM slot 3 and a mark 620 discriminating the carrier are displayed on the display screen 601. Similarly, information 611 showing the signal strength on the contracted line tailored to the SIM card in the SIM slot 4 and a mark 621 discriminating the carrier are displayed on the display screen 602.

The display screens displayed at this time are substantially the same size, although they can also be set to predetermined sizes.

Additionally, while not shown, information tailored to usable applications for each contracted line, such as an application for constantly displaying news information, for example, can of course also be displayed.

With the phone of the present embodiment, the line that the user wants to use (i.e., line to be activated) can be changed arbitrarily. Therefore, active discrimination information for discriminating which line is usable is held in the RAM 115. A frame 631 and a mark 630 indicating that the line is active can be displayed on the display screen of the active contracted line, based on this active discrimination information.

If, in S409, the card in the SIM slot 3 and the card in the SIM slot 4 correspond to the same carrier, the corresponding one of the communication units 122 or 123 is operated based on the identifiers of the cards (S412). Display screens for the lines tailored to the cards are then generated, and the display screens of the lines are simultaneously displayed on the display unit 2 after dividing the display area of the display unit 2 (S413). The screens displayed at this time will be comparable to the screens in FIG. 6.

In this case, however, it is also possible to display the signal strength information 610 on only one of the screens, since the same carrier is being used. Also, the marks 620 and 621 indicating the carrier can either be shown on only one of the screens or cleared from display.

If, in S401, a SIM card is not mounted in the SIM slot 3, it is determined whether a SIM card is mounted in the SIM slot 4 (S414). If a SIM card is not mounted in the SIM slot 4, information to the effect that SIM cards are not mounted is displayed on the display unit 2 (S427), and predetermined processing is recommenced. Note that in the present embodiment, functions using the communication units 122 and 123 cannot be used if SIM cards are not mounted, although it is assumed that other functions can be used.

If, in S414, a card is mounted in the SIM slot 4, an identifier like in FIG. 18 is read out from the SIM card via the SIM slot 4, and stored in the RAM 115 (S415). Next, a screen for authentication with the PIN code of the card in the SIM slot 4 is generated and displayed on the display unit 2 (S416).

Once a PIN code has been entered by the user as described above, it is determined whether the entered code matches a PIN code read out from the card in the SIM slot 4 (S417). If the PIN code matches and is correctly authenticated, whichever of the communication unit 122 and 123 corresponds to the authenticated card (here, the card in the SIM slot 4) is operated (S418). A screen for the line corresponding to the authenticated card is then generated by the display control unit 119, and displayed on the display unit 2 (S419).

Here, since a card is only mounted in the SIM slot 4, a screen will only be generated and displayed for the carrier of this card.

If, in S403, a SIM card is not mounted in the SIM slot 4, there will only be a SIM card mounted in the SIM slot 3. A screen for authentication with the PIN code of the card in the SIM slot 3 is therefore generated and displayed on the display unit 2 (S420). Once a PIN code has been entered by the user, it is determined whether the entered code matches a PIN code read out from the card in the SIM slot 3 (S421).

If the PIN code matches and is correctly authenticated, the processing proceeds to S418, where the communication unit corresponding to authenticated card (here, card in the SIM slot 3) is operated. A screen for the line corresponding to the authenticated card is then generated by the display control unit 119, and displayed on the display unit 2.

If, in S406, the PIN code of the card in the SIM slot 3 is not correctly authenticated, authentication using the card in the SIM slot 3 will have failed, and a warning message to the effect that the line cannot be used is displayed on the display unit 2 (S423).

A screen for authentication with the PIN code of the card in the SIM slot 4 is then generated and displayed on the display unit 2 (S424).

Once a PIN code has been entered by the user as described above, it is determined whether the entered code matches a PIN code read out from the card in the SIM slot 4 (S425). If the PIN code matches and is correctly authenticated, the processing proceeds to S418, where the communication unit corresponding to the authenticated card (here, card in the SIM slot 4) is operated. A screen for the line corresponding to the authenticated card is then generated by the display control unit 119, and displayed on the display unit 2.

Because authentication of the PIN codes will have failed for the cards in both the SIM slots 3 and 4 if authentication of the PIN code fails in S425, a warning message to that effect is displayed on the display unit 2 (S426).

If, in S408, the PIN code of the card in the SIM slot 4 is not correctly authenticated, authentication using the card in the SIM slot 4 will have failed, and a warning message to the effect that the line cannot be used is displayed on the display unit 2 (S422).

In this case, only the PIN code of the card in the SIM slot 3 will have been correctly authenticated, and the processing proceeds to S418, where the communication unit corresponding to the authenticated card (here, card in the SIM slot 3) is operated. A screen for the line corresponding to the authenticated card is then generated by the display control unit 119, and displayed on the display unit 2.

If, in S421 or S417, the PIN code is not correctly authenticated, authentication of the SIM card mounted in either the SIM slot 3 or the SIM slot 4 will have failed, with there being no card mounted in the other SIM slot.

Therefore, the processing proceeds to S426, where warning information is displayed to the effect that PIN code authentication of the SIM card has failed and authentication is locked.

The configuration of the screens displayed on the display unit 2 is thus determined when the phone is powered on, in accordance with identifiers read out from SIM cards mounted in the SIM slots 3 and 4.

Figure 5A:
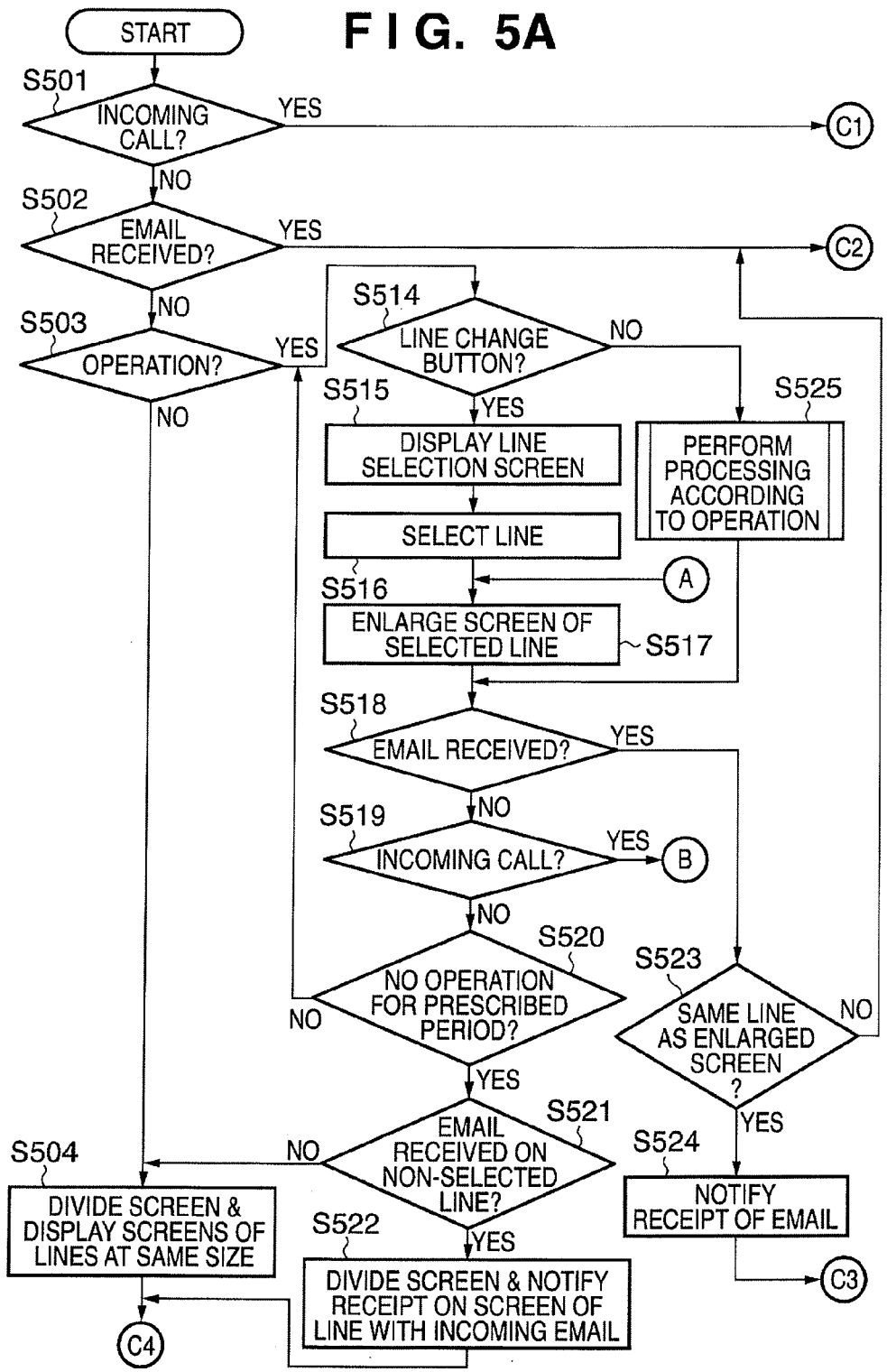
FIGS. 5A and 5B are flowcharts showing a display control when there is an incoming call.
Figure 5B:
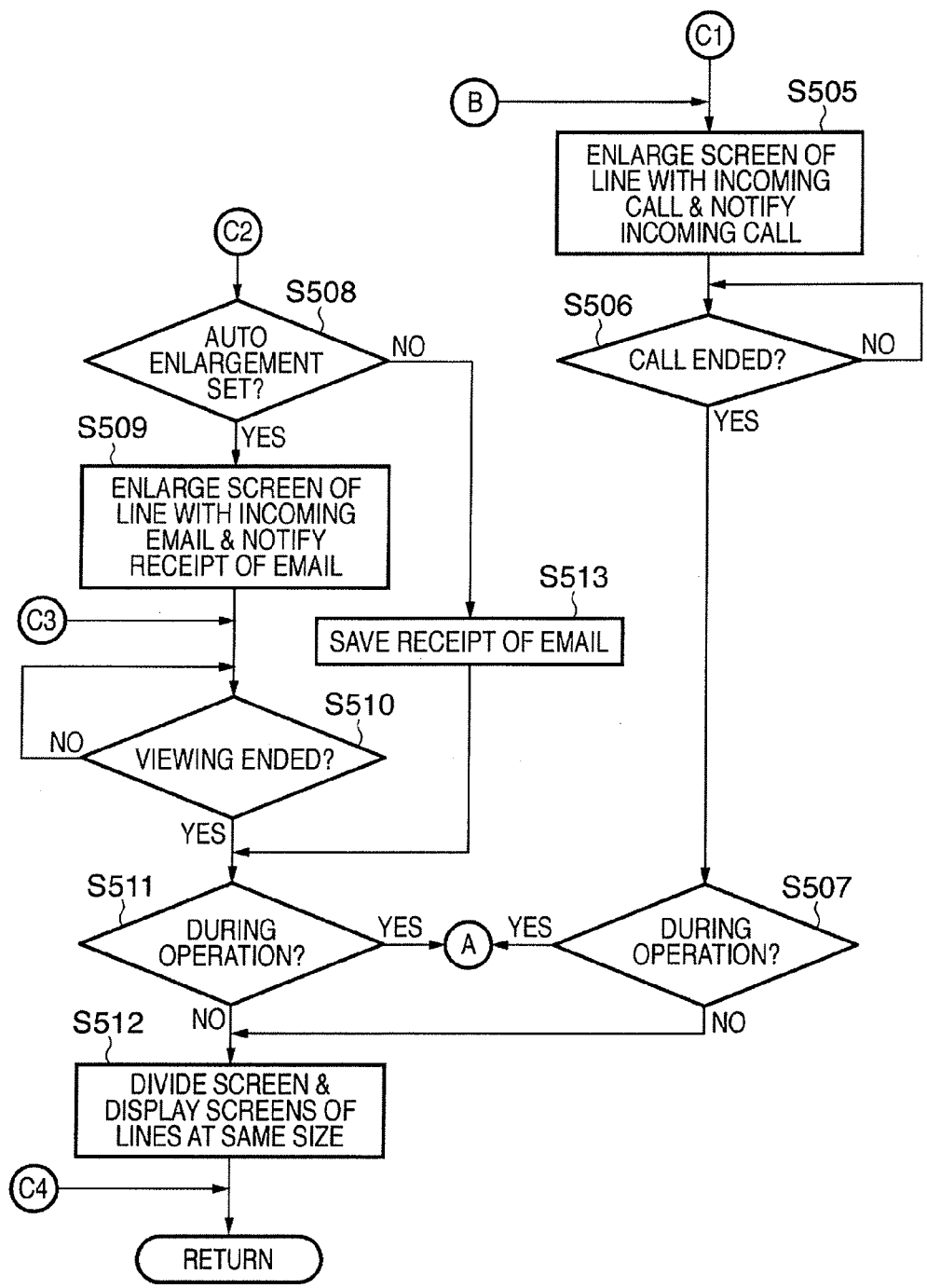

Next, switching of the display screens on the phone 100 after thus being powered on will be described using the flowcharts of FIGS. 5A and 5B. Note that the flowcharts of FIGS. 5A and 5B are executed as a result of the CPU 114 controlling various units. Also, in FIGS. 5A and 5B, the case where SIM cards corresponding to different carriers are mounted in the SIM slots 3 and 4 will be described. In the case where a SIM card is only mounted in one of the SIM slots 3 and 4, the operations will be similar to a conventional phone since only one communication line can be used.

If SIM cards corresponding to different carriers are mounted in the SIM slots 3 and 4, a display screen for each carrier will be displayed on the display unit 2, as shown in FIG. 6.

In this state, it is firstly determined whether there is an incoming call to one of the communication units 122 and 123 (S501).

If there is an incoming call to one of the communication units, the CPU 114 sends information to the effect that communication is not possible to the communication unit other than the communication unit that received the incoming call. The display screen of the line corresponding to the communication unit that received the incoming call is then enlarged by the display control unit 119, and displayed larger than display screen of the line with no incoming call.

Figure 7:
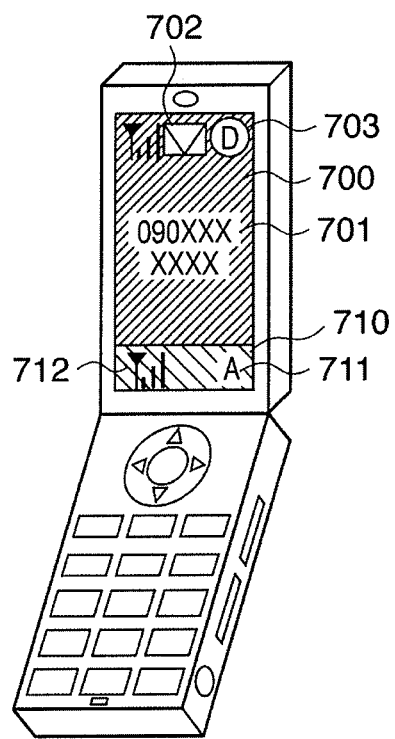
FIG. 7 shows the appearance of display screens on the mobile telephone.
Figure 8:
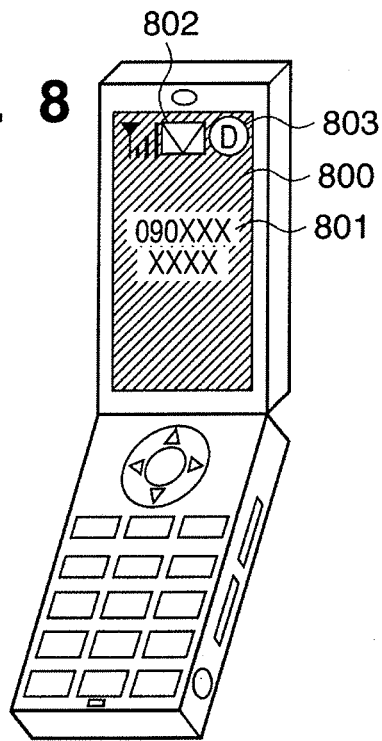
FIG. 8 shows the appearance of a display screen on the mobile telephone.

Specifically, two display screens such as in FIG. 6 are switched to the display shown in FIG. 7 or 8.

For example, if there is an incoming call to the latter of the carriers A and D displayed in FIG. 6, a display screen 700 for the carrier D that received the incoming call is enlarged, as shown in FIG. 7, and a number 701 of the originator is further displayed. Further, a mark 703 indicating active contracted line is displayed on the screen 700 of the contracted line with the incoming call.

On the other hand, a display screen 710 of the contracted line with no incoming call is reduced. A discrimination mark 711 of the contracted carrier and an icon 712 showing the signal strength are also displayed.

In the example shown in FIG. 8, a display screen 800 for the carrier D that received the incoming call out of the carriers A and D displayed in FIG. 6 is enlarged and displayed over the entire display unit 2. A number 801 of the originator and a mark 803 indicating active contracted line are also displayed on the screen 800. In FIG. 8, different from FIGS. 6 and 7, the display screen of the line with no incoming call is cleared from the display unit 2, rather than dividing the display area of the display unit 2.

The screens shown in FIG. 7 or 8 are displayed while waiting for the telephone conversation to end (S506). When an end call button of the key operation unit 8 is operated and the end of the telephone conversation is detected, it is determined whether the incoming call was during an operation, based on an operation discrimination flag discussed below (S507). If the incoming call was not during an operation, the display area of the display unit 2 is divided following the end of the call, and the display screens for the lines are displayed as shown in FIG. 6, similarly to before the incoming call (S512).

If, in S501, there is not an incoming call, it is determined whether an email was received (S502). If an email is received by one of the communication units 122 and 123, the baseband processing unit 106 or 113 notifies the CPU 114 that an email has been received.

When an email is received, it is determined whether a setting has been made to enlarge the screen of a line with an incoming email when the email is received (S508).

If an enlargement setting has been made, the display screen configuration of the display unit 2 is changed as shown in FIG. 7 or 8, similarly to the case of S505 (S509). In FIG. 7, the display screen for the line on which the email was received is enlarged. Information showing the email source address is displayed instead of the originator number. Similarly, in FIG. 8, the display screen for the line on which the email was received is displayed over the entire display unit 2.

The CPU 114 then waits for the user to finish viewing the email (S510).

When the user has finished viewing the email, it is determined whether the user was performing some sort of operation using the key operation unit 8 when the email was received, as will be discussed below. If the email was not received during an operation, the display area of the display unit 2 is divided, and the display screens for the lines are displayed as shown in FIG. 6, similarly to before the email was received (S512).

If, in S508, an automatic enlargement setting has not been made, information showing the line on which the email was received is saved to the RAM 115, and the processing proceeds to S511 (S513).

If, in S502, an incoming email is not detected, it is determined whether the key operation unit 8 or the line change button 7 has been operated (S503). If it is determined that there has not been an operation input, display screens for each line are displayed without change on the display unit 2, as shown in FIG. 6 (S504).

If, in S503, there has been an operation input, it is determined whether the line change button 7 was operated (S514). If the line change button 7 was not operated, processing in accordance with the operation is executed (S525). On the other hand, if the line change button 7 has been operated, the line selection screen shown in FIG. 9 is displayed on the display unit 2 by the display control unit 119 (S515).

Figure 9:
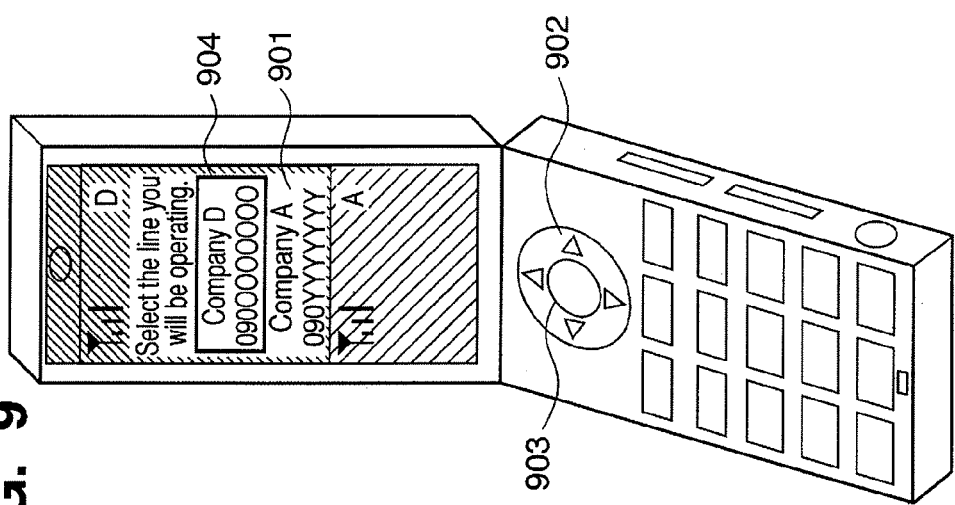
FIG. 9 shows the appearance of display screens on the mobile telephone.

In FIG. 9, reference numeral 901 denotes a line selection screen on which is displayed information showing the name of the carrier contracting the line and the contracted telephone number. A selection cursor 904 is displayed on the display screen of the selected line. The user moves the cursor 904 by operating a move button 902, and can thereby select a line. The line enclosed by the cursor 904 at the point at which the user operates a select button 903 after moving the cursor 904 is set as the active line (S516).

When a line is selected, the CPU 114 saves active discrimination information showing the selected line to the RAM 115.

The display screen for the selected line is displayed on the display unit 2 after being enlarged (S517). The display screen is as shown in FIG. 7 or FIG. 8, although information showing the originator is not displayed at this time. The user is able to use functions such as applications and the like corresponding to the selected line by operating the key operation unit 8, while viewing the screen enlarged as a result of the line thus being selected.

Note that, in the present embodiment, even if one of the lines has been selected using the line change button 7, the CPU 114 continues to wait for incoming calls and emails on both the selected line and the non-selected line.

It is determined whether there is an incoming email, with a line thus selected and the screen enlarged (S518). If there is an incoming email, it is determined whether the email is on the same line as the currently selected line (S523). If the email is on the same line, information notifying that an incoming email has been received is displayed on the screen currently being displayed (S524), and the processing proceeds to S510, where the CPU 114 waits for the user to finish viewing the email. Similar processing to the above processing is then executed.

On the other hand, if, in S523, the received email is on a line other than the currently selected communication line, the processing proceeds to S508, where it is determined whether automatic enlargement of the display screen when there is an incoming email has been set, as described previously. Thereinafter, similar processing to the above is executed.

If, in S518, there is not an incoming email, it is determined whether there is an incoming call (S519). If there is an incoming call, the processing proceeds to S505, where the display screen tailored to the line with the incoming call is enlarged and displayed on the display unit 2, together with a notification indicating receipt of the incoming call. Thereinafter, processing is performed as described above.

If, in S519, there is not an incoming call, it is determined whether the user is using a function tailored to the currently selected line by operating the key operation unit 8 (S520). If it is determined that the key operation unit 8 has not been operated for a prescribed period (few seconds) and that none of the functions of the selected line are being used, it is determined whether there was an incoming email on the non-selected line while the other line was selected (S521). Specifically, in the case where automatic enlargement display has not been set in S508, information showing that an email was received on the non-selected line has been saved.

In this case, an incoming email notification indicating that an email has been received is displayed on the display screen of the line with the incoming email, when the display area of the display unit 2 has been divided and the display screens for the lines are displayed as in FIG. 6 (S522).

Also, if, in S521, there is not an incoming email on the non-selected line, the processing proceeds to S504, where display screens tailored to the lines are split-screen displayed on the display unit 2, like in FIG. 6.

As described above, in the present embodiment, if the SIM cards of respectively different contracted lines are mounted in the two SIM slots, display screens for the lines are generated and displayed after dividing the display area of the display unit.

Therefore, information related to each line, such as the signal strength on the line, can be readily perceived.

When there is an incoming call, the screen for the line with an incoming call is enlarged, thereby enabling the user to easily execute talk processing using the line with the incoming call.

Moreover, when an email is received, the display screen of the line on which the email was received is enlarged if the enlargement setting has been made, rather than being enlarged immediately.

Therefore, in the case where the user is performing an operation using the display screen of a selected line when an email, considered less urgent than a telephone call, is received, the operation will not be interrupted.

Embodiment 2

Next, a second embodiment will be described.

In the first embodiment, the display area of a single display unit is divided in two, and display screens tailored to the lines of SIM cards mounted in two SIM slots are displayed.

In contrast, in the present embodiment, a case where the present invention is applied to a phone provided with two display units will be described.

Figure 10:
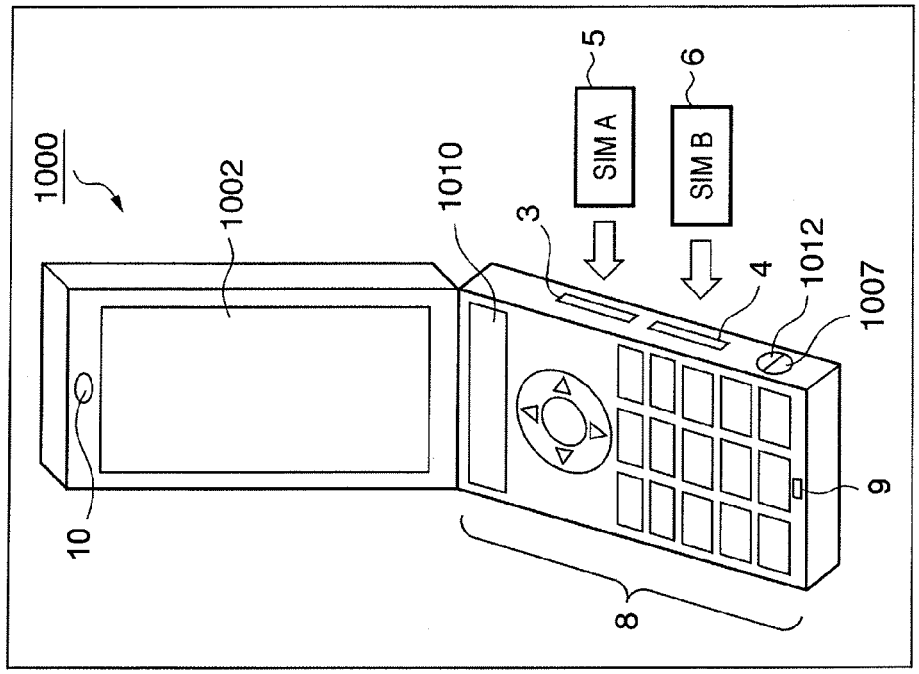
FIG. 10 is an external view of a mobile telephone in an embodiment.

FIG. 10 shows the appearance of a mobile telephone 1000 in the present embodiment. The phone in FIG. 10, having the same basic configuration as the phone 100 shown in FIG. 1, is provided with two SIM slots 3 and 4, a microphone 9, and a speaker 10. A key operation unit 8 for operating the phone is also provided.

Further, in the present embodiment, a sub LCD (display unit) 1010 is provided in addition to a main LCD (display unit) 1002. The phone has a screen change button 1012 for switching the display screen of the main LCD 1002 and the display screen of the sub LCD 1010, as will be discussed below. The phone also has a line change button 1007 for selecting whether to use the functions of either the line corresponding to the display screen of the main LCD 1002 or the line corresponding to the display screen of the sub LCD 1010.

Figure 11:
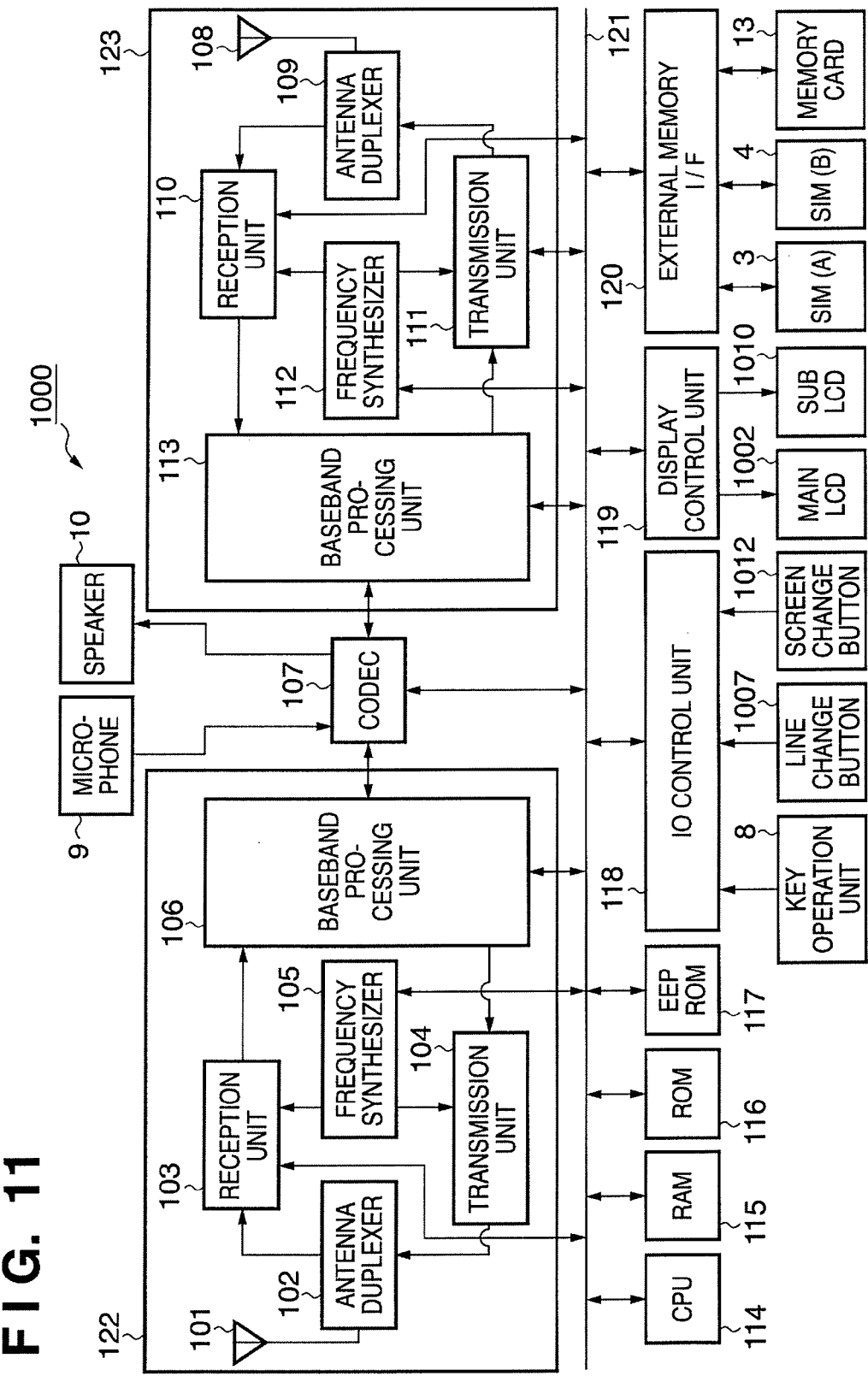
FIG. 11 is a block diagram showing a configuration of the mobile telephone in the embodiment.

FIG. 11 is a block diagram showing a circuitry configuration of the phone 1000 in the present embodiment. The configuration in FIG. 11 is substantially similar to the configuration of the first embodiment shown in FIG. 3, and the basic operations are also similar.

This configuration differs from FIG. 3 in that it includes the line change button 1007 for switching the line being used and the screen change button 1012 for interchanging the display screen of the main LCD 1002 and the display screen of the sub LCD 1010. An input/output (IO) control unit 118 detects inputs from the line change button 1007 and the screen change button 1012, in addition to detecting inputs from the key operation unit 8.

This configuration further differs from FIG. 3 in that it includes the main LCD 1002 and the sub LCD 1010, and a display control unit 119 controls the display operations of the LCDs.

The other constituent elements are similar to FIG. 3, thus the same numerals will be appended, and description thereof will be omitted here. Note that the sub LCD 1010 has a smaller display area than the main LCD 1002.

Next, SIM card detection and controls on the communication units 122 and 123, the main LCD 1002 and the sub LCD 1010 will be described using the flowcharts in FIGS. 12A and 12B.

Figure 12A:
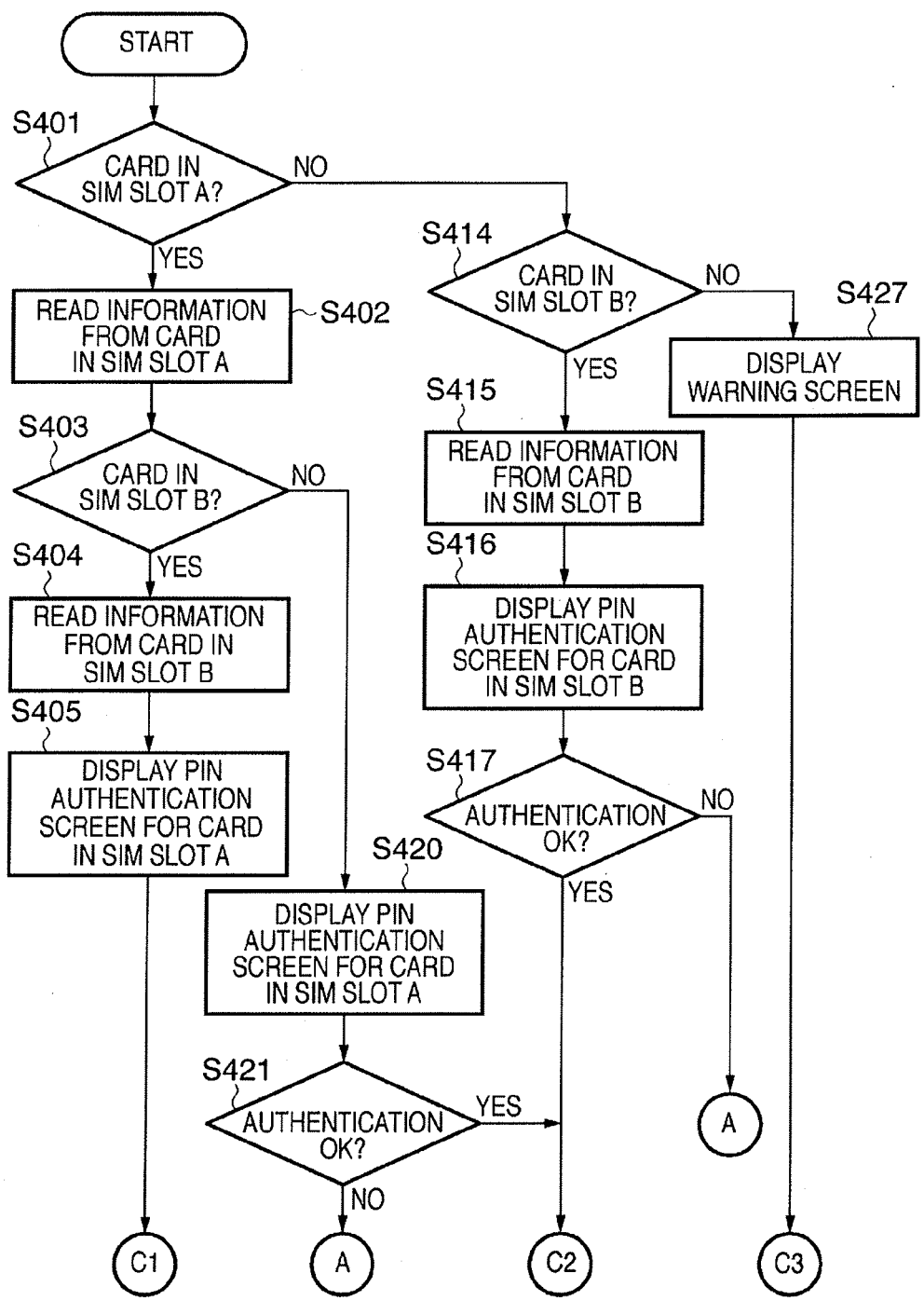
Figure 12B:
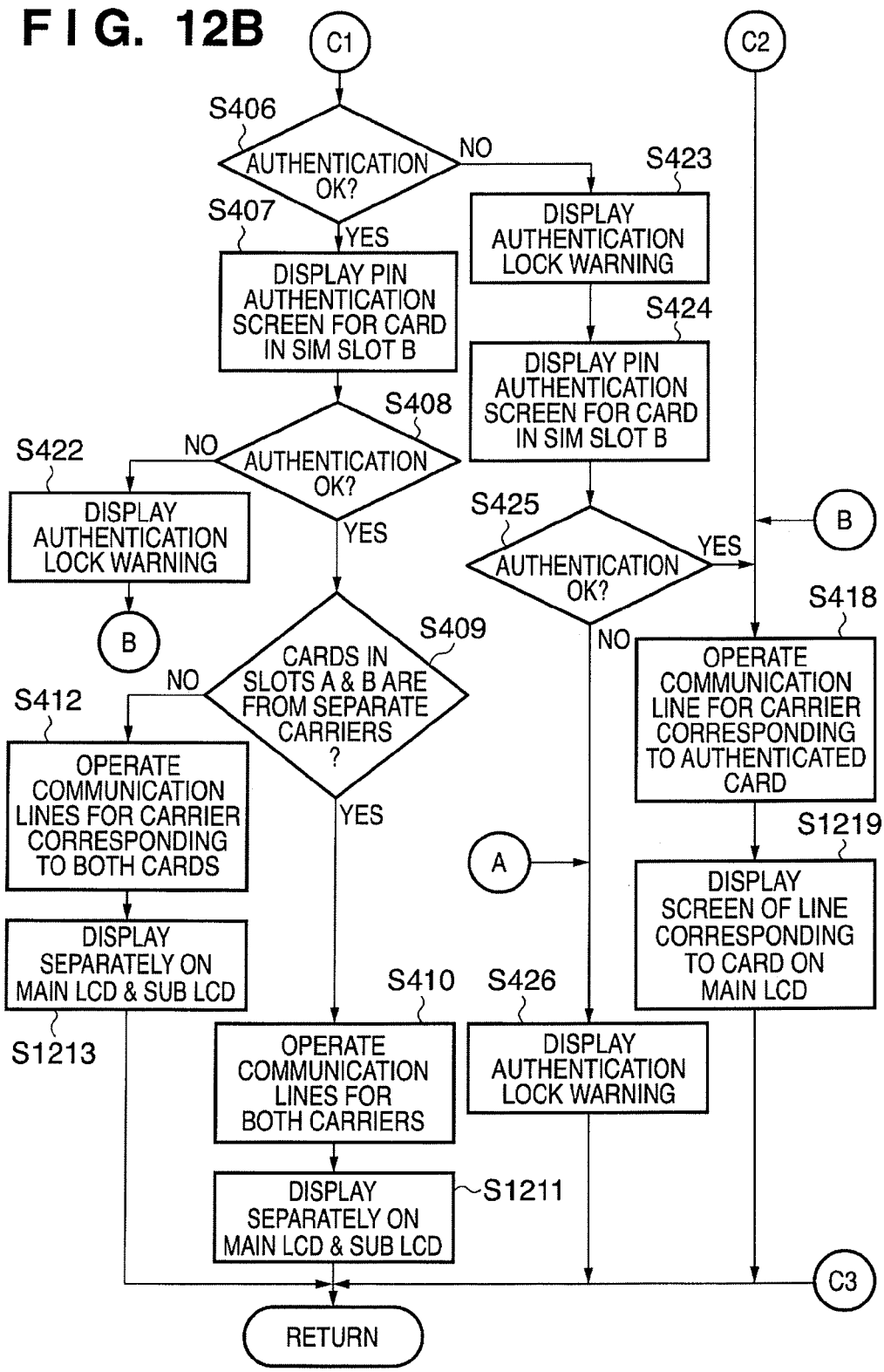

Note that while the processing in FIGS. 12A and 12B is virtually the same as the processing in FIGS. 4A and 4B, S1211, S1213, and S1219 constituting processing of the display screens of the lines corresponding to the SIM cards are different.

Specifically, firstly, in S1211, when display screens tailored to the lines of the SIM cards mounted in the SIM slots 3 and 4 are displayed, in the present embodiment, these display screens are displayed separately on the main LCD 1002 and the sub LCD 1010.

Figure 14:
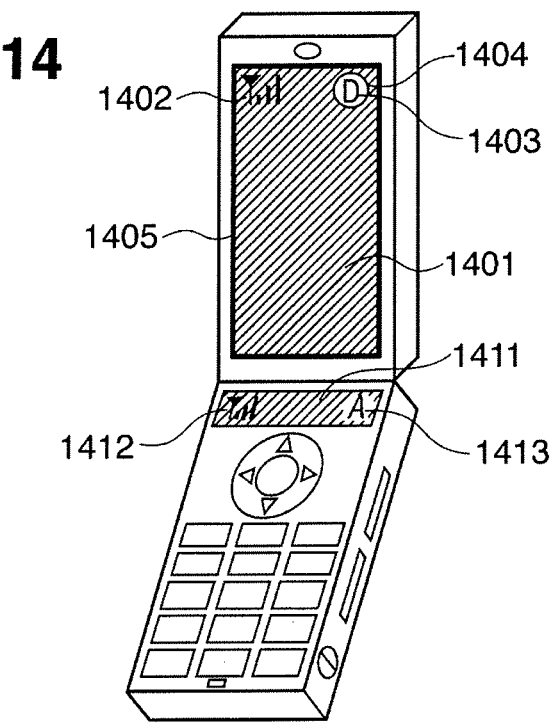
FIG. 14 shows the appearance of display screens on the mobile telephone.

FIG. 14 shows the appearance of the display screens in S1211.

In FIG. 14, a display screen 1401 tailored to one of the lines is displayed on the main LCD. Information 1402 showing the signal strength on the line and a mark 1403 discriminating the carrier that contracted the line are displayed on the display screen 1401. Further, a frame 1405 and a mark 1404 indicating that the functions of the line corresponding to the display screen displayed on the main LCD 1002 are usable with the key operation unit 8 are displayed.

On the other hand, a display screen 1411 corresponding to the line other than the line corresponding to the display screen of the main LCD 1002 is displayed on the sub LCD 1010. Information 1412 showing the signal strength and a mark 1413 discriminating the carrier that contracted the line are displayed on the display screen 1411 of the sub LCD 1010. Also, although not shown, the frame 1405 and the mark 1404 displayed on the main LCD 1002 can also be displayed on the display screen 1411 of the sub LCD 1010.

Note that the display screen corresponding to the line of either of the SIM cards mounted in the SIM slots 3 and 4 may be displayed on the main LCD 1002 at this time. In the present embodiment, it is assumed that the display screen corresponding to the line of the SIM card in the SIM slot 3 is displayed on the main LCD 1002.

In S1213, similarly to FIG. 14, display screens tailored to the lines of the SIM cards mounted in the SIM slots 3 and 4 are also displayed separately on the main LCD 1002 and the sub LCD 1010.

At this time, in S1213, it is possible to display the information 1402 showing the signal strength on only one of the screens, since the same carrier is being used. Also, the marks 1403 and 1413 indicating the carriers can also be either displayed on only one of the screens or cleared from display.

In S1219, either an SIM card is mounted in only one of the two SIM slots or PIN code authentication of one of the SIM cards mounted in the two SIM slots has failed.

Therefore, here, the display screen of the line corresponding to the authenticated SIM card is displayed on the main LCD 1002. At this time, the display on the sub LCD 1010 may be cleared, or other information can be displayed.

Also, the PIN code authentication lock warnings of S426, S422 and S423 are all displayed on the main LCD 1002.

Figure 13:
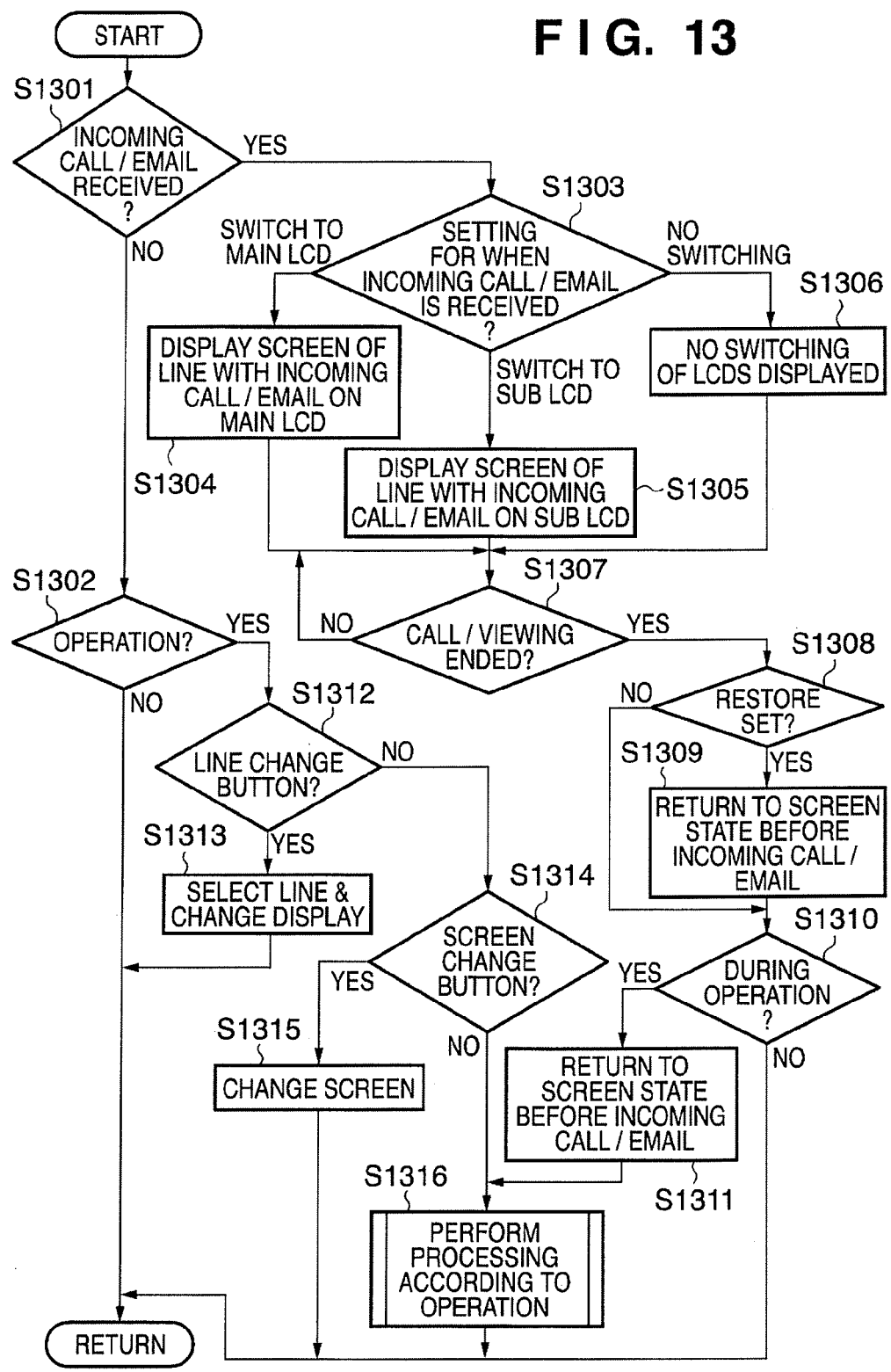
FIG. 13 is a flowchart showing a display control when there is an incoming call.

Next, the switching of the display screens on the phone 1000 after thus being powered on will be described using the flowchart of FIG. 13. Note that the flowchart of FIG. 13 is executed as a result of the CPU 114 controlling various units. Also, in FIG. 13, the case where SIM cards corresponding to different carriers are mounted in the SIM slots 3 and 4 will be described. In the case where a SIM card is only mounted in one of the SIM slots 3 and 4, the operations will be similar to a conventional phone since only one communication line can be used.

In the case where SIM cards corresponding to different carriers are mounted in the SIM slots 3 and 4, display screens for the carriers are displayed on the main LCD 1002 and the sub LCD 1010, as shown in FIG. 14.

In this state, it is firstly determined whether there has been an incoming call or email to one of the communication units 122 and 123 (S1301).

If there has been an incoming call or email to one of the communication units, the CPU 114 sends information to the effect that communication is not possible to the communication unit other than the communication unit that received the incoming call or email. The CPU 114 then detects the display screen settings for when an incoming call or email is received (S1303).

In the present embodiment, the settings of the display screen on the main LCD 1002 and the display screen on the sub LCD 1010 for when an incoming call or email is received can be changed as a result of the user operating the key operation unit 8.

Specifically, the user is able to make one of three settings, that is, to display the display screen of the line with the incoming call or email on the main LCD 1002, to display the display screen of the line with the incoming call or email on the sub LCD 1010, or to not change the display screens. Information showing the setting result is saved to the RAM 115.

Therefore, if display of the display screen of the line with the incoming call or email on the main LCD 1002 has been set, the display screen of the line with the incoming call or email is displayed on the main LCD 1002.

Figure 15:
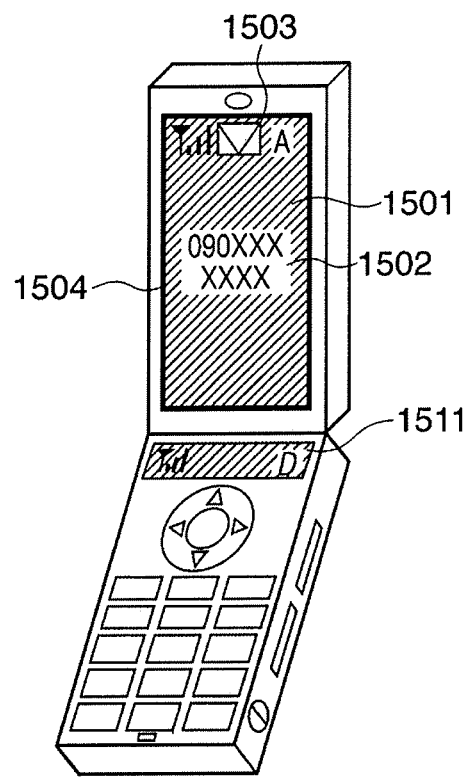
FIG. 15 shows the appearance of display screens on the mobile telephone.

FIG. 15 shows an exemplary display screen at this time.

A display screen 1501 of the line with the incoming call or email is displayed on the main LCD 1002. In the case of an incoming call, information 1502 showing the originator's telephone number is displayed. In the case of an email being received, an icon 1503 indicating receipt of an email is displayed.

The CPU 114 activates operation of the line corresponding to the display screen on the main LCD 1002. Therefore, a frame 1504 indicating that the line on the main LCD 1002 is operable using the key operation unit 8 is also displayed.

If, in S1303, display of the display screen of the line with the incoming call or email on the sub LCD 1010 is set, the display screen of the line with the incoming call or email is displayed on the sub LCD 1010 (S1305).

Figure 16:
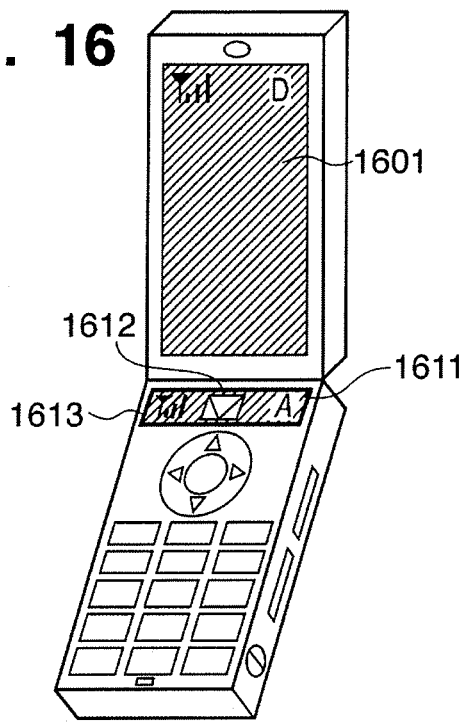
FIG. 16 shows the appearance of display screens on the mobile telephone.
Figure 17:
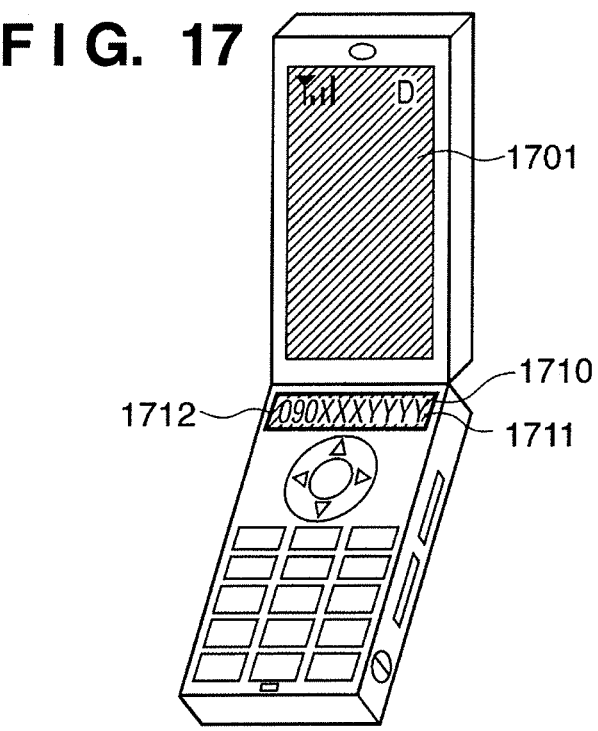
FIG. 17 shows the appearance of display screens on the mobile telephone.

FIGS. 16 and 17 show exemplary display screens at this time.

FIG. 16 shows the display screens in the case where an email is received.

A display screen 1601 of the line other than the line on which the email was received is displayed on the main LCD 1002, and a display screen 1611 of the line on which the email was received is displayed on the sub LCD 1010. An icon 1612 indicating the receipt of an email is also displayed. The CPU 114 activates operation of the line corresponding to the display screen on the sub LCD 1010. Therefore, a frame 1613 indicating that the line on the sub LCD 1010 is operable using the key operation unit 8 is displayed.

FIG. 17 shows the display screens when there is an incoming call.

A display screen 1701 of the line other than the line with the incoming call is displayed on the main LCD 1002, and a display screen 1710 of the line with the incoming call is displayed on the sub LCD 1010. Information 1711 showing the originator's telephone number is also displayed. The CPU 114 activates operation of the line corresponding to the display screen on the sub LCD 1010. Therefore, a frame 1712 indicating that the line on the sub LCD 1010 is operable using the key operation unit 8 is displayed.

If, in S1303, the setting is no display screen switching, the current display state is continued (S1306). At this time, however, the CPU 114 activates operation of the line with the incoming call or email. Therefore, a frame indicating that the line is operable using the key operation unit 8 is displayed on whichever of the display screens on the main LCD 1002 and the sub LCD 1010 corresponds to the line with the incoming call or email.

For example, if there is an incoming call to the line corresponding to the display screen of the sub LCD 1010 in the state in FIG. 14, the frame 1405 and the mark 1404 are shifted to the display screen 1411, rather than changing the display screens of the main LCD 1002 and the sub LCD 1010.

After thus controlling the display screens following the receipt of an incoming call or email, the CPU 114 waits for the call or the viewing of the email to end (S1307). It is then determined whether to automatically return the screen state and the operation authority changed in S1304 or S1305 to the state before the receipt of the incoming call or email (S1308).

In the present embodiment, it is possible to set whether or not to return to the original display state when the call or viewing of an email has ended, in addition to setting screen changes for when an incoming call or email is received, as a result of the user operating the key operation unit 8. Information showing the setting result is saved to the RAM 115. When the display screens are changed in S1304 or S1305, the setting state of the display screens on the main LCD 1002 and the sub LCD 1010 prior to the change is saved to the RAM 115.

In S1309, the display screens and operation authority are therefore returned to the pre-switching state based on the setting result saved in the RAM 115, in the case where auto restore has been set.

On the other hand, if restore has not been set, the processing proceeds without returning to the pre-switching state.

Next, it is determined whether an operation using the key operation unit 8 was being performed before transferring to the display screen switching process of S1303 (S1310).

In the present embodiment, it is assumed that key operation information showing whether a key operation was being performed when the incoming call or email was received is saved to the RAM 115, and its value is used in this determination. If it is determined that a key operation was being performed, the display screens and operation authority are returned to the pre-switching state based on the setting result saved in the RAM 115 (S1311). The processing then transfers to S1316, and the operation prior to the incoming call or email is continued.

On the other hand, if a key operation was not being performed, the original processing is continued.

If, in S1301, receipt of an incoming call or email is not detected, it is determined whether the IO control unit 118 has received some sort of operation input (S1302). If there was an operation input, it is determined whether the line change button 1007 was operated (S1312). If the line change button 1007 was operated, key operation authority is changed from the line set prior to the operation of the line change button 1007 to the other line (S1313).

In the present embodiment, information showing the line whose operation using the key operation unit 8 is active, out of the lines corresponding to the display screens of the main LCD 1002 and the sub LCD 1010, is saved to the RAM 115. Therefore, information showing the key operation authority is also updated if the line change button 1007 is operated in S1312.

The frame 1405, shown in FIG. 14, indicating the operable state of the line is also switched from the display screen prior to the line change button 1007 being operated to the other display screen.

If, in S1312, the line change button 1007 has not been operated, it is determined whether the screen change button 1012 was operated (S1314). If the screen change button 1012 was operated, the display screen of the main LCD 1002 is displayed on the sub LCD 1010, and the display screen of the sub LCD 1010 is displayed on the main LCD 1002 (S1315).

At this time, the line whose operation using the key operation unit 8 is active is not changed.

Therefore, if the screen change button 1012 is operated in the state in FIG. 14, for example, the mark 1404 and the frame 1405 is displayed on the sub LCD 1010 with the display screen 1401 of the main LCD 1002 being displayed on the sub LCD 1010. Also, the display screen 1411 of the sub LCD 1010 will be displayed on the main LCD 1002.

If, in S1314, the screen change button 1012 was not operated, then it was the key operation unit 8 that was operated, so processing is executed according to the operation (S1316). At this time, information indicating that a key operation is being performed is saved to the RAM 115. If a key operation is not performed during a fixed period, information showing a key operation saved to the RAM 115 is updated to a value showing that a key operation is not being performed.

As described above, in the present embodiment, if the SIM cards of respectively different contracted lines are mounted in the two SIM slots, display screens for the lines are generated and displayed on the two LCDs.

Therefore, information related to each line, such as the signal strength on the line, can be readily perceived.

Also, user-friendly display screens can be provided, because the user is able to arbitrarily select the lines displayed on the two LCDs.

Note that while the key operation unit 8 and the sub LCD 1010 are disposed separately in the present embodiment, a similar embodiment can also be realized using a touch panel display that integrates an LCD and an operation unit.

In this case, the sub LCD 1010 can be displayed at a similar size to the main LCD 1002, and the display form of the main LCD and the sub LCD need not be changed.

While the case where the phone is provided with two SIM slots, enabling two SIM cards to be mounted simultaneously, was described in the first embodiment, a configuration in which a plurality of three or more SIM cards can be mounted simultaneously is also possible.

In this case, the display screens of the lines tailored to the SIM cards may be generated, and displayed after dividing the display area of the display unit.

While communication line settings were performed in the forgoing embodiments after reading out identifiers of the subscriber from the SIM cards, the case where identifiers stored on another storage medium, rather than a SIM card, can also be similarly applied to the present invention.

While the case where the present invention is applied to a mobile telephone is described in the forgoing embodiments, the present invention is also similarly applicable to other devices that perform communication using a plurality of communication lines.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-131572, filed May 17, 2007, which is hereby incorporated by reference herein in its entirety.

The invention claimed is:

1. A communication apparatus comprising:
a communication unit that performs communication by using a first communication line and a second communication line;
a display unit;
a display controller that displays a first display screen for displaying information corresponding to the first communication line and displays a second screen for displaying information corresponding to the second communication line, on the display unit;
a selector that selects the first communication line or the second communication line,
wherein the display controller displays a display screen of the selected communication line with a size larger than a size of a display screen of an unselected communication line, and
wherein the display controller reduces the display screen of the selected communication line and enlarges the display screen of the unselected communication line, in response to an incoming call to the unselected communication line that is received when the display screen of the selected communication line is displayed with a size larger than a size of the display screen of the unselected communication line.

2. The communication apparatus according to claim 1, wherein the display controller, in response to an end of a telephone conversation that follows the incoming call, returns the size of the display screen of the unselected communication line to the size before the change.

3. The communication apparatus according to claim 1, wherein the display controller respectively displays, on the first and second display screens, information showing the carriers of the communication lines.

4. The communication apparatus according to claim 1, wherein the display control unit respectively displays, on the first and second display screens, information showing signal strengths of the communication lines.

5. The communication apparatus according to claim 1, wherein the display controller respectively displays, on the first and second display screens, information representing the carriers of the communication lines.

* * * * *